UNITED STATES PATENT OFFICE.

HILAIRE ANDRÉ LEVALLOIS, OF PARIS, FRANCE.

IMPROVEMENT IN THE MANUFACTURE OF STEEL.

Specification forming part of Letters Patent No. 134,685, dated January 7, 1873.

*To all whom it may concern:*

Be it known that I, HILAIRE ANDRÉ LEVALLOIS, of Paris, France, have invented a new and useful Improvement in the Manufacture of Steel; and I do hereby declare the following to be a full, clear, and exact description thereof, which will enable those skilled in the art to make and use the same.

This invention relates to a compound prepared from soft iron, tungsten, and nickel, which forms a cast-steel of superior quality, which is not liable to rust, and the cost of which does not exceed that of ordinary cast-steel of good quality.

The proportions in which I mix the ingredients of my steel compound together vary according to the desired quality.

For the first quality I use soft iron, ninety-three parts; tungsten, six and one-half parts; nickel, one-half part.

For the second quality I use soft iron, ninety-five parts; tungsten, four and one-half parts; nickel, one-half part.

For the third quality I use soft iron, ninety-seven parts; tungsten, two and one-half parts; nickel, one-half part.

The furnaces and crucibles employed in producing my steel compound are the same as those ordinarily employed in the manufacture of cast-steel. The tungsten and nickel are mixed together and inclosed, with a suitable flux in a soft-sheet-iron tube, which is placed in the center of the charge, said charge being sprinkled over with a quantity of the flux, varying in proportion to the quantity of the metal treated between one-half part and two parts of flux to one hundred parts of metal. As soon as the mass has become liquid it is run off in the usual way into a sand or metal mold, the latter being lined with a mixture of clay and percarburet of iron. Before and during the process of running off the fused metal a vacuum is produced in the mold by covering the bottom of the funnel with a diaphragm of parchment, which is destroyed by the contact of the fused metal. When the alloy is run into a metal mold the ingot is removed as soon as it becomes solidified. It is then annealed in a closed vessel, and allowed to cool gradually.

The steel produced as above described may be hammered in the same way as ordinary steel.

The flux which I use, by preference in carrying out my invention is composed of the following ingredients: Boric acid, or biborate of soda, thirty-six parts; calcined silex, thirty-two parts; carbonate of lime, thirty-two parts.

These ingredients are pulverized in a mortar, and when thoroughly mixed together the compound is placed in small quantities in a crucible heated to a white heat, and, when liquefied, it (the compound) is run off on a fluted cast-iron plate; and, finally, the flux thus obtained is crushed into small particles before it is used.

What I claim as new, and desire to secure by Letters Patent, is—

A compound for steel, made of the ingredients herein specified, and mixed together substantially in the manner and about in the proportion set forth.

H. A. LEVALLOIS.

Witnesses:
H. BONNEVILLE,
H. GUITTERY.